(12) United States Patent
Jansen et al.

(10) Patent No.: US 8,650,880 B1
(45) Date of Patent: Feb. 18, 2014

(54) ACTIVE COMBUSTION CONTROL FOR TURBINE ENGINE

(75) Inventors: Harvey B. Jansen, Mesa, AZ (US); Matthew C. Caspermeyer, Phoenix, AZ (US)

(73) Assignee: Jansen's Aircraft Systems Controls, Inc., Tempe, AZ (US)

( * ) Notice: Subject to any disclaimer, the term of this patent is extended or adjusted under 35 U.S.C. 154(b) by 1010 days.

(21) Appl. No.: 12/705,905

(22) Filed: Feb. 15, 2010

Related U.S. Application Data (60) Provisional application No. 61/152,524, filed on Feb. 13, 2009.

(51) Int. Cl.
 *F02C 7/24* (2006.01)
(52) U.S. Cl.
 USPC .............................................. 60/725; 60/741
(58) Field of Classification Search
 USPC .............. 60/741, 725, 740, 39.281, 776, 779, 60/39.091, 223; 239/569, 581.1, 581.2, 239/582.1, 583, 584, 585.1, 533.2
See application file for complete search history.

(56) References Cited

U.S. PATENT DOCUMENTS

| | | | |
|---|---|---|---|
| 6,381,947 B2 * | 5/2002 | Emmons | 60/39.281 |
| 6,390,129 B2 | 5/2002 | Jansen et al. | |
| 6,543,232 B1 * | 4/2003 | Anderson et al. | 60/741 |
| 6,640,549 B1 | 11/2003 | Wilson et al. | |
| 6,659,050 B1 * | 12/2003 | Creech et al. | 123/41.08 |
| 6,840,046 B2 | 1/2005 | Paschereit et al. | |
| 7,004,449 B2 | 2/2006 | Jansen | |
| 7,654,092 B2 | 2/2010 | Ryan et al. | |
| 2001/0019252 A1 * | 9/2001 | Watanabe | 318/727 |
| 2002/0162336 A1 | 11/2002 | Weisenstein | |
| 2007/0017217 A1 * | 1/2007 | Kouzu et al. | 60/289 |
| 2007/0271927 A1 * | 11/2007 | Myers et al. | 60/776 |
| 2008/0134684 A1 | 6/2008 | Umeh et al. | |
| 2009/0026398 A1 | 1/2009 | Overman et al. | |
| 2009/0204306 A1 | 8/2009 | Goeke et al. | |

* cited by examiner

*Primary Examiner* — Andrew Nguyen
(74) *Attorney, Agent, or Firm* — Quarles & Brady LLP (57) ABSTRACT

An active combustion control device provides modulated fuel flow to the combustor of a turbine engine to mitigate combustion instability. The device includes a valve unit and an electronic valve driver controlling translation and rotation components in the valve unit that drive a metering member having a modulating end. The axial position and rotation of the end geometries relative to static flow ports inside the valve unit modulate the fuel flowing from the valve unit to the combustor atomizer. The amplitude and frequency of the modulated fuel flow match that of the instable combustor fuel flow and the phase is offset by 180 degrees so that the resultant fuel flow is at or near a stable state.

19 Claims, 5 Drawing Sheets

ACTIVE COMBUSTION CONTROL FOR TURBINE ENGINE

CROSS-REFERENCE TO RELATED APPLICATIONS

This application claims priority to U.S. Provisional Application No. 61/152,524, filed on Feb. 13, 2009.

STATEMENT OF FEDERALLY SPONSORED RESEARCH OR DEVELOPMENT

This invention was made with government support under NNX10CC76P awarded by the National Aeronautics and Space Administration. The government has certain rights in the invention.

BACKGROUND OF THE INVENTION

The present invention relates to gas turbine engines, and more particularly, to devices and systems for mitigating combustion instability in gas turbine engines.

Gas turbine engines are well known for generating power and for propelling various types of flight vehicles, including high-speed air-breathing vehicles such as ramjet and scramjet powered flight vehicles. Generally, the combustor section of the turbine engine receives fuel and an oxidizer for combustion. The oxidizer, such as air, is passed through the compressor section of the turbine engine. The compressed air stream is mixed with the fuel, which is typically introduced into the combustor section via one or more injectors or atomizers. The air/fuel mixture is then ignited by a burner causing rapid expansion within the combustor section. The expanding air from the combustor section flows through the turbine section of the engine causing rotationally mounted turbine blades to rotate and generate energy. The air exiting the turbine section is exhausted from the engine via the exhaust section, thereby creating thrust.

A significant problem in the design of gas turbine engines, particularly low-emission, high-performance turbine engines, is combustion instability. Combustion dynamics in the form of fluctuations in pressure and heat-release rate can give rise to combustion instability, which is generally considered to be the presence of high-amplitude acoustic pressure waves or vibrations within the combustor resulting from the combustion process. In addition to reducing engine efficiency and performance, these high-amplitude vibrations can damage hardware components and lead to turbine failure. The term "screech" is used in the industry to describe high-frequency pressure oscillations, which are likely to cause structural damage to the combustor and combustion components. The term "rumble" is used in the industry to describe low-frequency pressure oscillations, which create inefficiencies in turbine performance.

The two general methods know for addressing combustion instability are passive combustion control and active combustion control. Generally, passive control refers to addressing the dynamic pressure oscillations by the design characteristics of certain components, such as the shape or capacity of the combustion chamber or the pattern of fuel injectors therein. On the other hand, active control generally refers to the monitoring of the combustor environment and actively controlling combustion parameters to reduce combustion instability.

One type of active combustion control system includes introducing modulated fuel into the combustor. Generally, sensors detect combustor dynamics and provide feedback signals to a controller, which in turn operates a control valve to modulate the fuel prior to injection into the combustor. The fuel amplitude, frequency and phase are modulated so that by cancellation of waves the pressure oscillation within the combustor is mitigated or offset entirely, thereby tending to stabilize combustion. See e.g., U.S. Pat. Nos. 6,640,549 and 7,654,092 and U.S. Pub. Nos. 2002/0162336, 2008/0134684, 2009/0204306 and 2009/0026398.

Many of the aforementioned patent documents pertain to aspects of the electronic control of the modulation or the arrangement of the modulated burner assemblies, rather than the construction of the modulating control valve. Moreover, many prior art combustion control systems are not suited for operation at high frequencies, such as 1,000 Hz or more, which are prevalent in high-performance propulsion systems used in high-speed flight vehicles.

U.S. patent application publication No. 2009/0026398 describes various high-frequency fuel modulating valve constructions. This published application discloses modulating valves with oscillating latching valve assemblies. In particular, the valves have oscillating rotors, made of ferritic magnetic flux permeably material, that rotate between electromagnetically latched positions to control flow of modulated fuel to the outlet of the valve. The valves rely on springs for rotating the rotor between latched positions, such as an arrangement of coiled springs, a torsion spring or a cantilever spring. The use of springs introduces inaccuracies in flow modulation resulting from inherent variations and imprecision in spring rate(s). The springs are also difficult to assemble and leave the valve susceptible to failure. The imprecision and failure risk leave such valve constructions undesirable for critical, high-performance applications.

An improved active combustion control device is thus needed to mitigate high-frequency combustion instability, particularly present in high-performance propulsion systems.

SUMMARY OF THE INVENTION

The invention is an active combustion control device that provides modulated fuel flow to the combustor of a turbine engine to mitigate combustion instability.

In one aspect, the present invention provides an active combustion control device having a housing with an inlet, an outlet and an internal cavity defining a fuel flow path between the inlet and the outlet and passing through at least one static flow port. A metering member extends along a valve axis and has a modulating end cooperating with the static flow port to effect modulated fuel flow at the outlet. A translation component within the housing translates the metering member along the valve axis to control the amplitude of the modulated fuel flow. A rotation component within the valve housing rotates the metering member along the valve axis to control the frequency of the modulated fuel flow.

An electronic valve driver drives the translation and rotation components to move the metering member in accordance with the frequency, amplitude and phase of fuel flow within the combustor of the turbine engine. The frequency and amplitude of the modulated fuel flow are closely matched to that of the combustor fuel flow and the phase of the modulated fuel flow is essentially 180 degrees out of phase with that of the combustor fuel flow. A position sensing component, such as a resolver, senses the rotational position of the metering meter and provides feedback signals to the electronic valve driver for use in resolving the phase angle. A proportional solenoid can be used to translate the metering member, and a DC motor can be used to rotate the metering member.

The metering member can be in the form of an elongated shaft or spool type valve and has a modulating end with various projections and recesses. As mentioned, the axial position of the metering member relative to the static flow port(s) largely determines the amplitude modulation of the modulated fuel flow. The geometry of the modulating end of the metering member, specifically its rotation and rotational position of the metering end geometry, relative to the static flow port(s) primarily effect the frequency modulation of the modulated fuel flow. The modulating end of the metering member, for example, can have spaced apart axially extending projections with grooves between them. The projections and grooves can be the same size and be in alternating arrangement about the valve axis. Other smooth or rectilinear random or periodic patterns, including for example, regular sine, square, triangle or saw-tooth wave patterns or other non-regular, or complex patterns can be used. In any case, as the modulating end of the metering member rotates, the fuel passing through the static flow port(s) encounters a changing flow area, either more or less blocked by the projecting geometry of the metering member, such that the fuel flow becomes modulated at a frequency and phase set by the electronic valve driver. The amplitude and frequency of the modulated fuel flow match that of the instable combustor fuel flow and the phase is offset by 180 degrees so that the resultant fuel flow within the combustor is at or near a stable state.

In another aspect, the invention provides an active combustion control device including a valve unit and an electronic valve driver. The valve unit is mountable directly to the turbine combustor so that an outlet couples to an atomizer of the combustor. The valve unit has a metering member driven axially along, and rotationally about, a valve axis to effect modulated fuel flow at the outlet. The electronic valve driver is operatively connected to the valve unit to control translation and rotation of the metering member to achieve an amplitude and frequency of the modulated fuel flow essentially the same as that of fuel within the combustor and to achieve a phase of the modulated fuel flow essentially 180 degrees out of phase with that of the combustor fuel.

These and other aspects and advantages of the invention will be apparent from the detailed description and drawings. What follows are one or more example embodiments of the present invention. To assess the full scope of the invention the claims should be looked to, as the example embodiments are not intended as the only embodiments within the scope of the invention.

DETAILED DESCRIPTION OF THE EXAMPLE EMBODIMENTS

The invention provides an active combustion control ("ACC") device that modulates fuel to the combustor of a turbine engine to mitigate combustion instability. It is preferably configured to operate in the extreme environment of propulsion systems for supersonic and hypersonic flight vehicles. The ACC device, however, is also suitable for lower speed conventional flight vehicles as well as use in industrial applications, such as power generation turbines.

Figure 1:
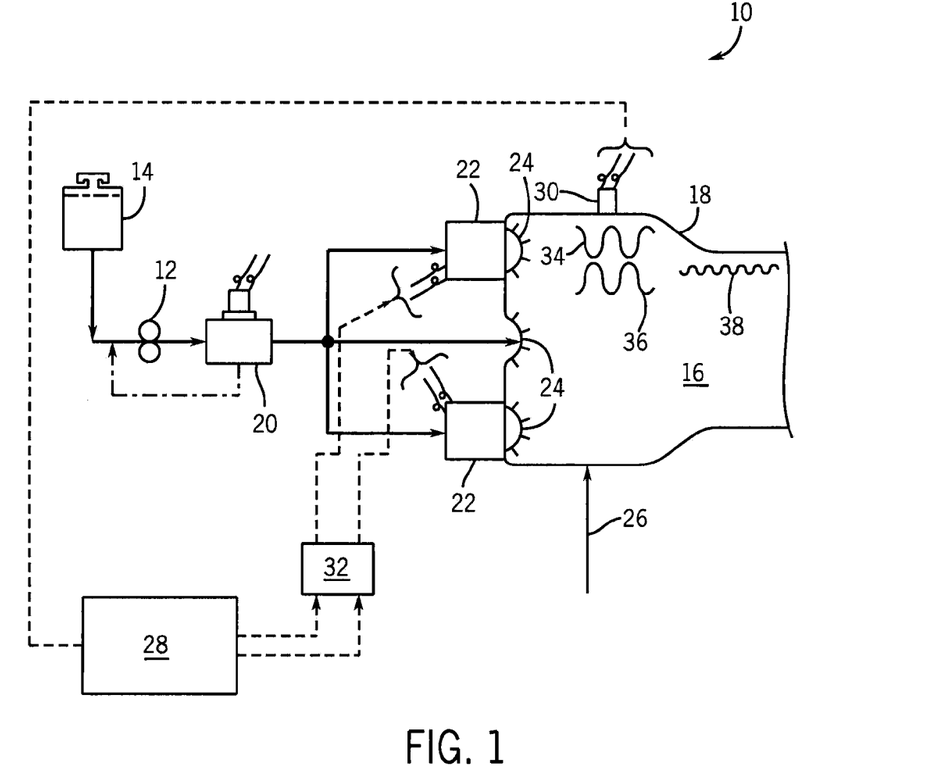
FIG. 1 is a schematic view of a fuel system for a gas turbine engine incorporating the ACC device of the present invention.

FIG. 1 shows a simplified schematic diagram of a gas turbine fuel system 10 having active combustion control according to the present invention. Fuel is pumped via fuel pump 12 from a fuel reservoir 14 and delivered under pressure to the combustion chamber 16 of the turbine engine 18 by one or more metering valves 20 (one shown) and one or more ACC devices 22 (two shown) through a plurality of injectors or atomizers 24 (three shown) mounted to the combustion chamber 16. An oxidizer, such as air, is delivered under pressure to the combustion chamber 16, for example via one or more air lines 26 (one shown), for mixing with the fuel prior to combustion. The overall operation of the fuel system 10 is monitored and controlled by a master computer 28, which receives feedback pressure signals from one or more sensors inside the combustion chamber 16, such as the high-speed pressure transducer 30 shown. The master computer 28 controls one or more electronic valve drivers ("EVD") 32 which in turn control the actuation components of the ACC devices 22 (one EVD 32 shown controlling two ACC devices 22). Thus, one or more of the atomizers 24 inject metered, but non-modulated fuel into the combustion chamber 16 and one or more of the atomizers 24 inject modulated fuel into the combustion chamber 16. The basic function of the ACC devices 22 is to provide modulated fuel flow, shown schematically as wave 34, that is of the same or nearly the same amplitude and frequency, while being offset 180 degrees in phase, from the combustor fuel flow 36, so that the resultant fuel flow 38 is significantly more stable, that is having significantly less pressure fluctuations.

The active combustion control provided by the present invention is actually a two-part system including the modulating valve hardware and the electronic drive, namely the ACC device 22 and the EVD 32. As mentioned, the EVD 32 is controlled by the master computer 28 which feeds it information regarding the dynamic environment within the combustion chamber 16 of the turbine engine 18, in particular the dynamic pressure conditions of the combustor fuel flow 36. The master computer 28 thus instructs the EVD 32 regarding how to drive the ACC device 22 to modulate the frequency and amplitude of the modulated fuel 34 to match the combustor fuel flow 36, and also to offset the phase of the modulated fuel 34. As mentioned, the active combustion control system can include multiple ACC devices 22, which are driven by one or more EVDs 32. The EVD 32 can be any suitable conventional electronic valve driver having modulating/demodulating and amplifier circuitry capable of operating multiple actuation components at sufficiently high rates and precision, such as providing modulating frequencies of 1,000 Hz or more with modulation strengths of 30% full flow or more. One such electronic valve driver is available from Dynic Labs, Inc. of St. Louis, Mo. As such, the details of the driver will not be addressed herein.

Figure 2:
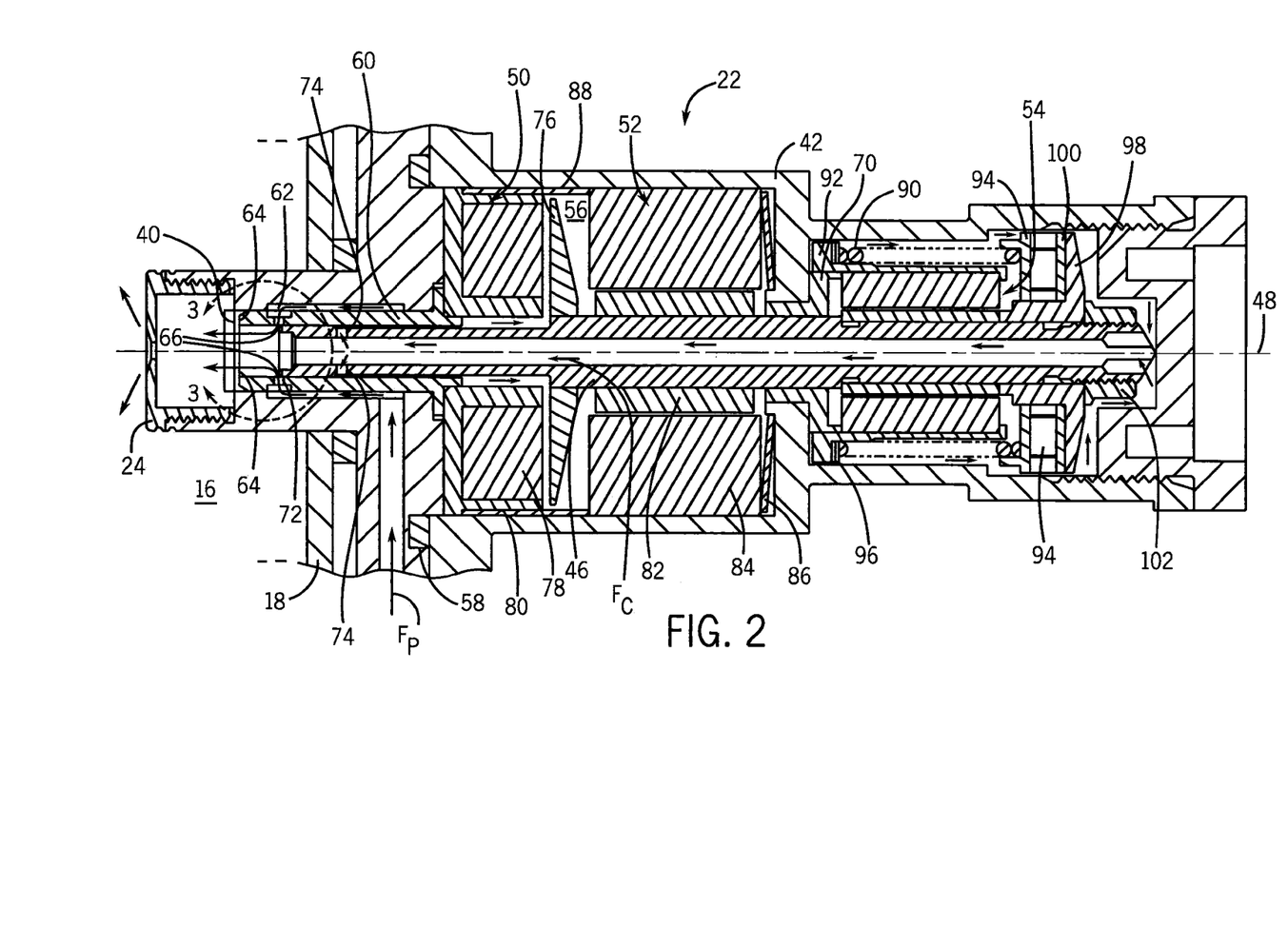
FIG. 2 is a sectional view of the ACC device shown therein.

FIG. 2 illustrates one suitable construction of the ACC device 22. Initially it should be noted that the ACC device 22 of the present invention is designed to be mountable directly to the combustion chamber 16 at the location of the associated atomizer 24 (shown schematically in FIG. 2), and thereby bring the outlet of the ACC device 22 in close proximity to the atomizer 24 so as to minimize the distance that the modulated fuel flow travels before being injected into the combustion chamber 16, and thereby reduce amplitude attenuation of the modulated fuel. In the exemplary embodiment depicted in FIG. 2, the atomizer 24 mounts to the ACC device 22 adjacent to an outlet 40 at a narrow end of a housing 42, which is sealed against the combustion can by a metal seal 44. However, other arrangements can be used to mount the ACC device so that its outlet is in close proximity to the atomizer.

The primary components of the ACC device 22 include a metering spool 46 which is rotated about a valve axis 48 by a solenoid 50 and translated axially along the valve axis 48 by a motor 52. The spool's rotational position, and that of the motor 52, is determined by a resolver 54. The solenoid 50, motor 52 and resolver 54 are electrically coupled to with EVD 32 so that the EVD 32 can drive the solenoid 50 and motor 52 to move the spool 46 as needed to modulate the fuel according to the dynamic conditions of the combustor fuel resolved by and communicated from the master computer. The resolver 54 provides feedback regarding the frequency and rotational position of the spool 46 and motor 52 to the EVD 32 which is used to match frequency and offset phase of the modulated and combustor fuel flows as well as to control commutation of the motor 52, which can be a frameless, brushless DC motor. The resolver 54 can be a suitable commercially available analog or digital resolver, and the solenoid can be a suitable commercially available solenoid coil, which can be driven by the EVD 32 to translate the spool 46 in proportion to the input signal to the coil.

An internal cavity 56 of the housing 42 contains the spool 46, the solenoid 50, the motor 52 and the resolver 54 as well as defines a primary fuel flow path (shown by the large arrows Fp) extending from an inlet 58 to the outlet 40. The internal cavity 56 has open spaces, which during operation, are flooded with fuel that follows a recirculation path (shown by the small arrows Fc) to cool the internal components. Moreover, the internal cavity 56 contains additional components that support and secure the aforementioned primary components of the ACC device 22 that carry out the modulation of the fuel.

The construction of the ACC device 22 shown in FIG. 2 will now be described in greater detail. Working from left to right in FIG. 2, as mentioned, the narrow end of the housing 42 supports the atomizer 24 within the combustion chamber 16 adjacent to the outlet 40 of the ACC device 22. A spool sleeve 60 is pressed into the inner diameter of the narrow end of the housing 42 with a small annular clearance 62 leading from the inlet 58 to a pair of opposed circular openings 64 and rectangular static flow ports 66. The primary fuel flow path is thus defined by the inlet 58 and internal passage leading to the annular clearance 62, the spool sleeve openings 64 and static flow ports 66 and the hollow interior of the spool sleeve 60 leading to the outlet 40.

The spool sleeve 60 fits about a modulating end 72 of the spool 46, which will be discussed in detail below with regard to FIGS. 3A-5B. The spool 46 extends along the valve axis 48 and translates and rotates on central bushing 70 within the spool sleeve 60. The spool 46 is open-ended and has a hollow core which forms part of the recirculation path for the cooling fuel. Specifically, cooling fuel flows into the spool 46 from the end opposite the modulating end 72, down its hollow core and out of radial openings 74. The spool 46 has a reduced outer diameter for an axial distance to provide clearance for the cooling fuel to pass from the openings 74 between the spool 46 and the spool sleeve 60. Note that despite the open modulating end 72 of the spool 46, its rotation prevents the cooling fuel from mixing with the modulated fuel flow and being output from the ACC device 22. The spool 46 supports a large diameter, disc-shaped rotor or clapper 76 which interacts magnetically with the energized coil 78 of the solenoid 50 to axially translate the spool 46. The coil 78 is contained by a bobbin 80. A rotor 82 of the motor 52 is pressed onto an intermediate section of the spool 46 so that when energy is applied to the motor windings 84 the rotor 82, and thereby the spool 46, will rotate about the valve axis 48. The solenoid 50 and the motor 52 are secured within the housing 42 via a Belleville spring 86 which acts on the motor 52, which in turn acts against a sleeve 88 that presses the solenoid bobbin 82 against an interior wall of the housing 42.

The tail end of the spool 46 interacts with the resolver 54 as well as a return spring 90, which is captured between an annular retainer element 92 and a thrust plate 94. The spring 90 can be pre-loaded with one or more shims 96. Thrust forces from axial movement of the spool 46 are taken up by roller thrust bearing 98 which sits between the thrust plate 94 and ring retainer 92. A hardened spacer 100 can be used to provide a proper surface for the thrust bearing 98. The resolver, spring and thrust bearing components are secured onto the spool 46 by a nut 102.

While the solenoid 50 and motor 52 components, driven by the EVC 32, control the axial and rotational movement of the spool 46, it is the contact of the fuel with the geometry at the modulating end 72 of the spool 46 that imparts modulation to the fuel. The frequency and amplitude of the modulation is dependent upon the specific geometry of the modulating end 72 of the spool 46 as well as the axial and angular position of that geometry relative to the static flow ports 64. Furthermore, the quantity and geometry of the static flow ports 64 themselves can also affect the modulation. For example, square, circular, triangular or various other rectilinear or curvilinear shapes could be utilized.

Figure 3A:
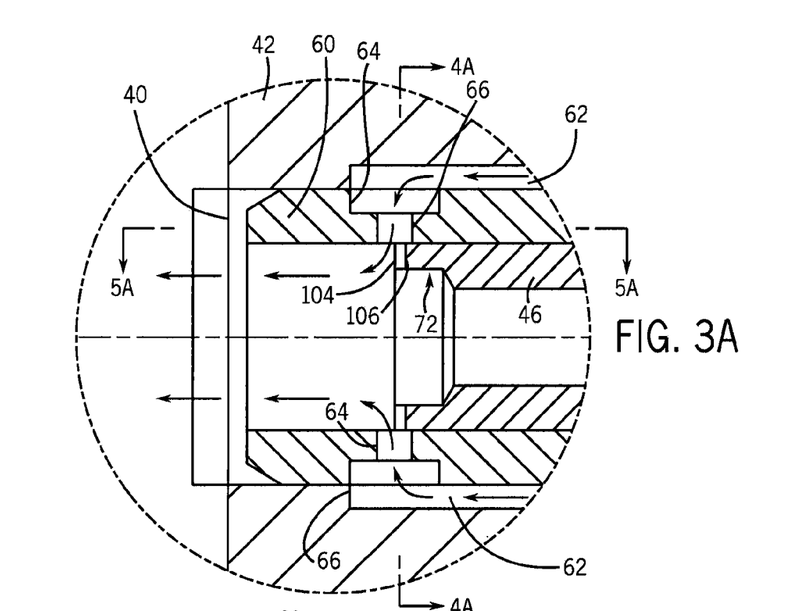
FIG. 3A is an enlarged partial sectional view of the modulating end of the ACC device shown in FIG. 2 taken along arc 3-3.
Figure 3B:
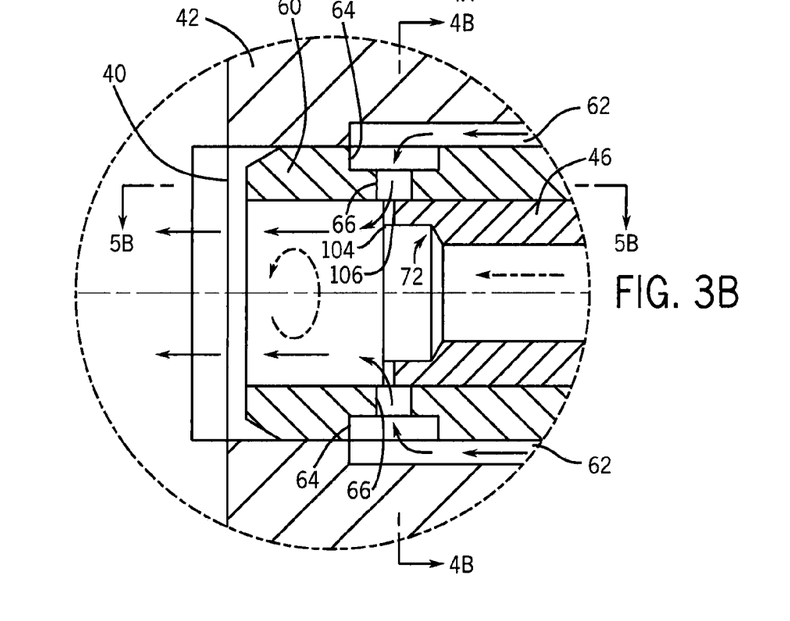
FIG. 3B is an enlarged sectional view similar to FIG. 3A albeit shown in a different axial and angular position.
Figure 4A:
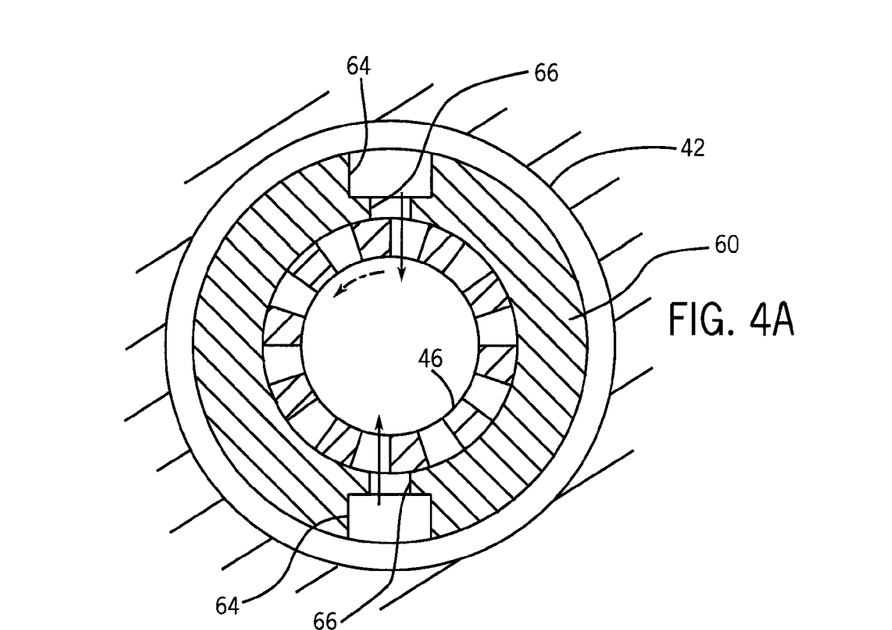
FIG. 4A is an enlarged end view taken along line 4A-4A of FIG. 3A.
Figure 4B:
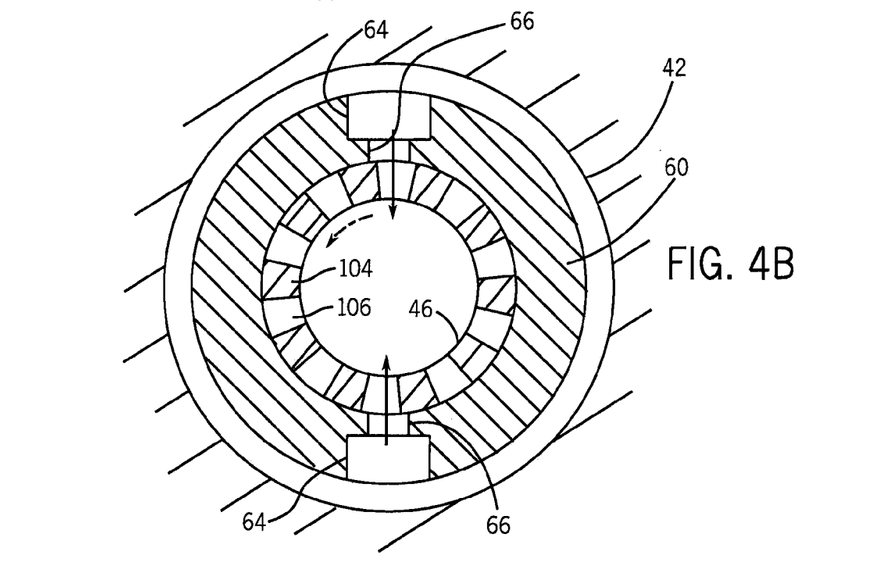
FIG. 4B is an enlarged end view taken along line 4B-4B of FIG. 3B.
Figure 5A:
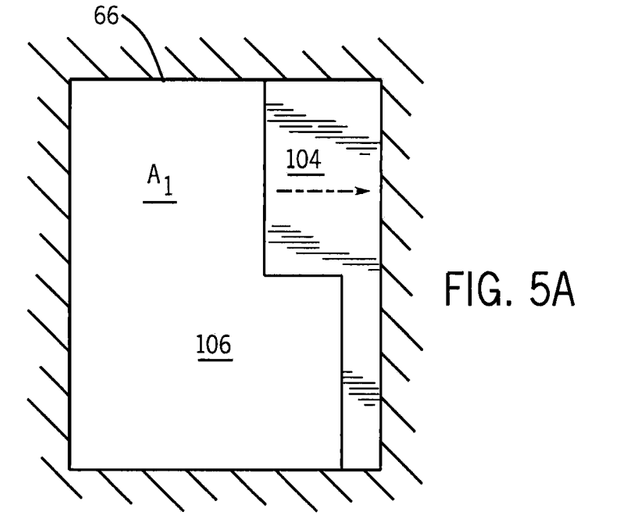
FIG. 5A is a plan view taken along line 5A-5A of FIG. 3A.
Figure 5B:
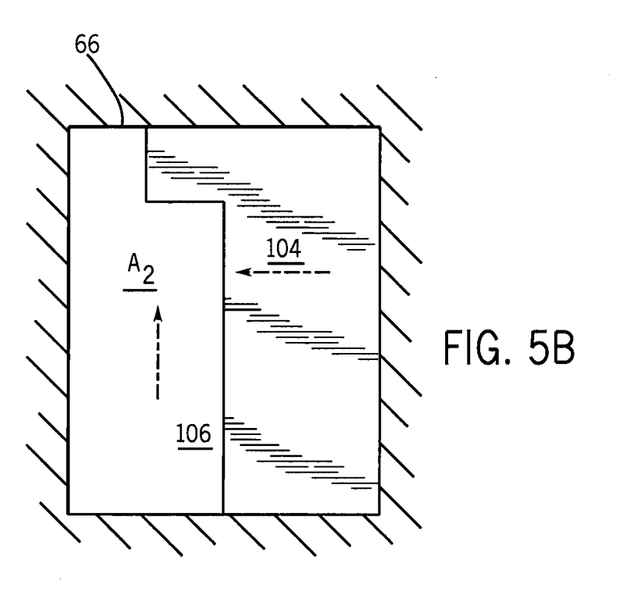
FIG. 5B is a plan view taken along line 5B-5B of FIG. 3B.

To better illustrate how the spool 46 physically imparts the modulation to the fuel, FIGS. 3A and 3B show an enlarged view of an end the ACC device 22, specifically the modulating end 72 of the spool 46 and the spool sleeve 60. Furthermore, FIG. 3A shows the spool 46 in the position shown in FIG. 2. FIG. 3B shows the spool 46 at different axial and rotational positions, as indicated by the arrows, in which the spool 46 is moved axially against the spring 90 and rotated counterclockwise approximately a quarter step. FIGS. 4A and 4B show end views of the spool sleeve 66 and modulating end 72 of the spool 46 in the different positions of respective FIGS. 3A and 3B and show one exemplary geometry of the modulating end of the spool 46. FIGS. 5A and 5B illustrate the flow area "seen" by the fuel passing through one of the static flow ports 64 with the spool 46 in the positions shown in respective FIGS. 3A and 3B.

More specifically, with reference to FIG. 3A, the incoming fuel to the ACC device 22 is guided into the openings 64 and static flow ports 66 in the spool sleeve 60. Two pairs of openings 64/ports 66 are shown in FIG. 3A spaced apart 180 degrees at the 12 o'clock and 6 o'clock positions. However, a greater number of such pairs could be used provided the number and arrangement does not create an imbalance of the flow forces acting on the spool 46. Moreover, the openings 64 are shown as circular and the flow ports 66 as rectangular windows (see FIG. 5A). However, both the openings 64 and the flow ports 66 could be shaped differently, however, doing so could have an affect on fuel modulation. The spool sleeve 60 is stationary as are the openings 64 and flow ports 66. Therefore, the fuel is modulated by the modulating end 72 of the spool 46. Specifically, the amplitude modulation is primary dependent upon the axial position of the spool 46 relative to the static flow ports 66, and the frequency modulation is primary dependent upon the rate of revolution of the metering end 72 of the spool 46. Generally, greater amplitude modulation is achieved by translating the spool 46 (leftward in FIG. 3A) to impede flow through the static flow ports 66 to a greater extent. Higher frequency modulation is achieved by rotating the spool 46 at a higher rate. Moreover, in essence, the axial position of the spool 46, which is controlled by the solenoid 50, can be considered to determine the "DC" component of the overall flow area, while the position of the modulating end geometry with respect to the static flow ports can be considered to determine the "AC" component of the overall flow area.

For example, the position of the modulating end 72 of the spool 46 in FIG. 3B is axially advanced further (leftward) with respect to the static flow ports 66 than it is in FIGS. 3A and 5A. Consequently, the flow area for fuel passing through the static flow ports 66 is decreased in the FIG. 3B position, which corresponds to an increase in pressure and a higher amplitude modulation.

As mentioned, the frequency modulation, and to some extent also the amplitude modulation, is affected by the geometry of the modulating end 72 of the spool 46. FIGS. 4A and 4B illustrate one exemplary geometry for the modulating end 72 of the spool 46. Specifically, the modulating end 72 is fluted or has an end surface defined by alternating axial projections 104 and recesses or grooves 106 spaced about the valve axis 48, each extending the radial thickness of the annular spool 46. When associated grooves 106 are rotated in registration with the static flow ports 66, the full area of the static flow ports are available for fuel flow to the outlet. When associated projections 104 are rotated in registration with the static flow ports 66, then the flow area is closed. This repeated opening and closing of the static flow ports 66 creates a pulsing of the fuel flow at a specific frequency. Furthermore, the flow area through the static flow ports 66 undergoes non-binary changes during the rotation of the spool 46 between the fully open and fully closed positions. For example, when the spool 46 is in the rotational position shown in FIG. 5A, flow area $A_1$ is "seen" by the fuel passing though each static flow port 66 while flow area $A_2$ is available when in the FIG. 5B position. Consequently, the resulting modulation generally follows that of a sine wave of a given amplitude and phase. Furthermore, since $A_2$ is less than $A_1$, the amplitude modulation is also increased in the FIG. 5B. Thus, both the axial and the angular position of the modulating end 72 of the spool 46 can affect amplitude modulation.

The geometry of the modulating end can affect modulation since different geometry will cause the fuel to encounter more or less impediment to flow and at a greater or lesser time interval. In the exemplary embodiment shown, there are ten pairs of essentially straight axial projections 104 and grooves 106 with the protections extending an axial distance of approximately 0.01 inches from the grooves 106. For example, rotating the spool 46 at 6,000 revolutions per minute will effect a 1,000 Hz modulated frequency, with the bulk amplitude modulation varying based on the axial position of the spool.

While the exemplary fluted end geometry is depicted and described herein, other geometries may be suitable. For example, a different size and/or quantity of projections and grooves of the configuration depicted herein may be used. Alternatively, the modulating end surface could be formed from a smooth undulating surface, a saw-tooth surface or a ramped surface with or without flat areas between adjacent ramps. Moreover, these various surface geometries could have void features (depressions, grooves, recesses, etc.) in a periodic arrangement (evenly angularly spaced about the valve axis) or in a random arrangement. And further, each void or raised feature could be formed of complex geometry, such as a U-shaped recess or a triangular projection. The resulting modulation could thus be made to track that of a periodic wave, such as a sine wave, square wave, saw-tooth wave, as well as any other non-periodic waveform.

Finally, as mentioned above, the phase modulation of the fuel is set by the EVD 32 to be offset 180 degrees from that of the combustor fuel using the master computer 28 and dynamic combustor pressure feedback as well as the angular position feedback from the resolver 54, which is suitably clocked with respect to the spool 46.

It should be appreciated that merely exemplary embodiments of the invention have been described above. However, many modifications and variations thereto will be apparent to those skilled in the art, which will be within the spirit and scope of the invention. Therefore, the invention should not be limited to the described embodiments. To ascertain the full scope of the invention, the following claims should be referenced.

The invention claimed is:

1. An active combustion control device for mitigating combustion instability within a combustor of a turbine engine, the device comprising:
   a housing having an inlet and an outlet and an internal cavity defining a fuel flow path between the inlet and the outlet, the fuel flow path passing through at least one static flow port;
   a metering member extending along a valve axis and having a modulating end cooperating with the static flow port to effect modulated fuel flow at the outlet, wherein the modulating end defines an end face having at least one projection such that the end face varies with respect to the static flow port according to the rotational position of the metering member such that at a given axial position of the metering member the modulating end obstructs the fuel flow path differently when in a first rotational position than when in a second rotational position;
   a translation component for translating the metering member along the valve axis to control the amplitude of the modulated fuel flow; and
   a rotation component for rotating the metering member along the valve axis to control the frequency of the modulated fuel flow.

2. The device of claim 1, further including an electronic valve driver operatively coupled to the translation and rotation components for driving translation and rotation of the metering member according to the frequency, amplitude and phase of the modulated fuel flow and a combustor fuel flow within the combustor of the turbine engine.

3. The device of claim 2, wherein the frequency and amplitude of the modulated fuel flow are essentially the same as that of the combustor fuel flow, and wherein the phase of the modulated fuel flow is essentially 180 degrees out of phase with that of the combustor fuel flow.

4. The device of claim 2, further including a position sensing component for sensing the rotational position of the metering meter.

5. The device of claim 4, wherein the position sensing component provides feedback signals to the electronic valve driver.

6. The device of claim 1, wherein the translation component includes a solenoid.

7. The device of claim 6, wherein an armature is mounted to the metering member and interacts with the solenoid to effect translation of the metering member.

8. The device of claim 1, wherein the rotation component is a motor having a stator fixed within the housing cavity and rotor mounted to the metering member.

9. The device of claim 1, wherein the translation component is a proportional solenoid and the rotation component is a brushless motor.

10. The device of claim 1, wherein the end face of the modulating end of the metering member has a plurality of projections and recesses angularly spaced about the valve axis.

11. The device of claim 10, wherein the recesses extend the entire radial dimension of the projections.

12. An active combustion control device for mitigating combustion instability within a combustor of a turbine engine, the device comprising:
    a valve unit mountable directly to a combustor of the turbine engine so that an outlet couples to an atomizer of the combustor, the valve unit having a metering member driven axially along and rotationally about a valve axis to effect modulated fuel flow at the outlet, wherein the valve unit has a static flow port and the metering member has a modulating end defining an end face having at least one projection such that the end face varies with respect to the static flow port according to the rotational position of the metering member such that at a given axial position of the metering member the modulating end obstructs a fuel flow path differently when in a first rotational position than when in a second rotational position; and
    an electronic valve driver operatively connected to the valve unit to control translation and rotation of the metering member to achieve an amplitude and frequency of the modulated fuel flow essentially the same as that of a combustor fuel flow within the combustor and to achieve a phase of the modulated fuel flow essentially 180 degrees out of phase with that of the combustor fuel flow.

13. The device of claim 12, wherein the end face of the modulating end has a plurality of projections and recesses.

14. An active combustion control device for mitigating combustion instability within a combustor of a turbine engine, the device comprising:
    a housing having an inlet and an outlet and an internal cavity defining a fuel flow path between the inlet and the outlet, the fuel flow path passing through at least one static flow port;
    a solenoid disposed within the internal cavity of the housing; a motor disposed with within the internal cavity of the housing; a metering member extending along a valve axis and having a modulating end cooperating with the static flow port to effect modulated fuel flow at the outlet, wherein the modulating end defines an end face having at least one projection such that the end face varies with respect to the static flow port according to the rotational position of the metering member such that at a given axial position of the metering member the modulating end obstructs the fuel flow path differently when in a first rotational position than when in a second rotational position; and
    an electronic valve driver driving the solenoid to translate the metering member along the valve axis to control an amplitude of the modulated fuel flow, driving the motor to rotate the metering member about the valve axis to control a frequency of the modulated fuel flow and to control a phase of the modulated fuel flow;
    wherein the valve driver operates the solenoid and motor to move the metering member such that the amplitude and frequency of the modulated fuel flow are essentially the same as that of a combustor fuel flow within a combustor of the turbine engine and wherein the phase of the modulated fuel flow is essentially 180 degrees out of phase with that of the combustor fuel flow.

15. The device of claim 14, wherein an armature is mounted to the metering member and interacts with the solenoid to effect translation of the metering member.

16. The device of claim 14, further including a resolver for sensing the frequency and rotational position of the metering member.

17. The device of claim 16, wherein the electronic valve driver receives input signals of the frequency and rotational position of the metering member from the resolver for use in controlling the frequency and phase of the modulated fuel flow.

18. The device of claim 14, wherein the end face of the modulating end of the metering member has a plurality of projections and recesses angularly spaced about the valve axis.

19. The device of claim 18, wherein the recesses extend the entire radial dimension of the projections.

* * * * *

UNITED STATES PATENT AND TRADEMARK OFFICE
CERTIFICATE OF CORRECTION

| | | |
|---|---|---|
| PATENT NO. | : 8,650,880 B1 | Page 1 of 1 |
| APPLICATION NO. | : 12/705905 | |
| DATED | : February 18, 2014 | |
| INVENTOR(S) | : Harvey B. Jansen and Matthew C. Caspermeyer | |

It is certified that error appears in the above-identified patent and that said Letters Patent is hereby corrected as shown below:

In the Claims

Col. 10, line 2, claim 14 "disposed with within" should read --disposed within--

Signed and Sealed this
Twenty-seventh Day of May, 2014

Michelle K. Lee
*Deputy Director of the United States Patent and Trademark Office*